May 3, 1932.   R. STALZER   1,856,794
WINDOW CLEANER'S SEAT
Filed June 16, 1931
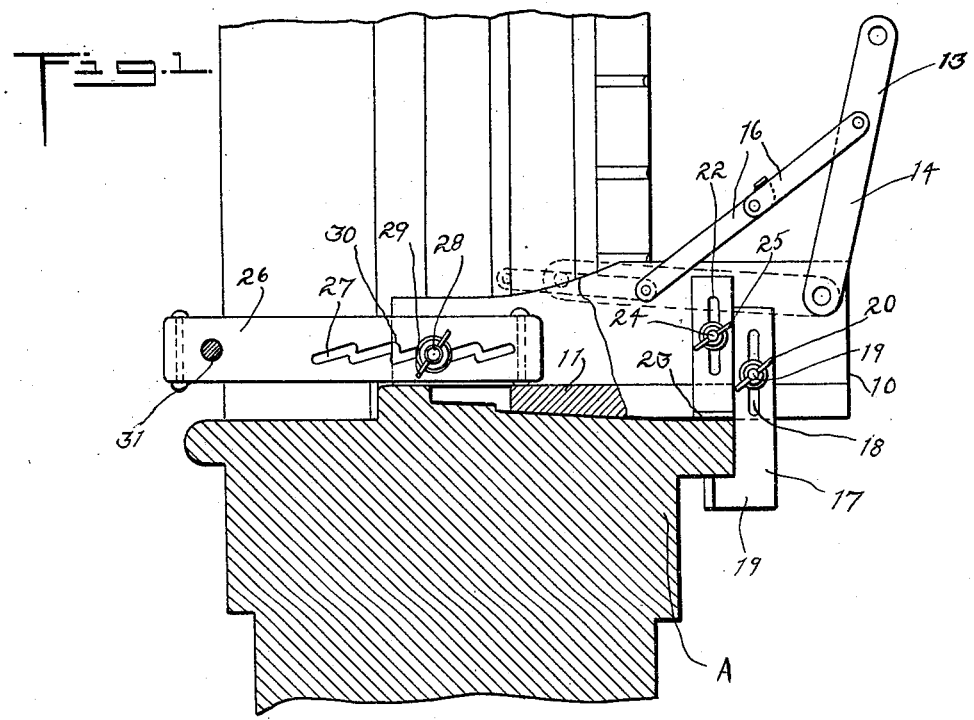
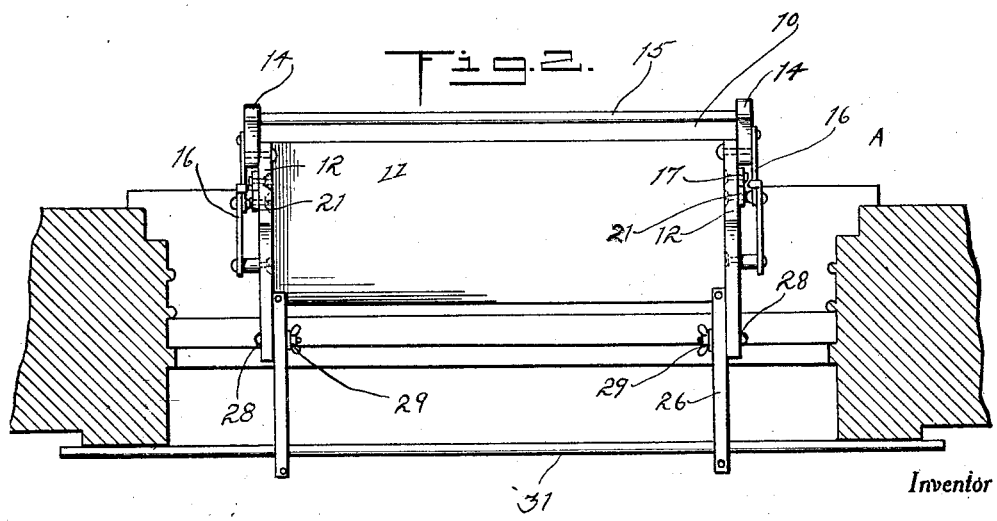
Inventor
RUDOLPH STALZER
By Clarence A. O'Brien
Attorney Patented May 3, 1932

1,856,794

UNITED STATES PATENT OFFICE

RUDOLPH STALZER, OF BROOKLYN, NEW YORK

WINDOW CLEANER'S SEAT

Application filed June 16, 1931. Serial No. 544,836.

This invention relates to improvements in window cleaners' seats.

The primary object of the invention resides in a seat for attachment to the sill of a window for safely accommodating a person in a seated position when washing the outer glass panes of the upper and lower sashes of a window.

Another object of the invention is to provide a seat having adjustable clamping means by which the same may be securely attached to window sills of various sizes and constructions.

A further object is the provision of a seat having a foldable back which may be folded over the seat proper in a compact manner when the device is not in use, and which prevents the user from falling backward when seated thereon with the back in a raised position.

A still further object is the provision of a device of the kind mentioned which is simple of construction, easy to attach or remove from the seat of a window, and strong and durable for the purposes intended.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a fragmentary vertical sectional view through a window with my improved window cleaner's seat in position thereon, with parts broken away in section.

Figure 2 is a horizontal section through the window showing the seat in top plan.

Referring to the drawings by reference characters, the numeral 10 designates a seat member which includes a flat bottom 11, and upstanding side walls 12, the front ends of the side walls extending beyond the front edge of the bottom 11. Pivoted to the side walls 12 adjacent the rear ends thereof is a foldable back rest 13 which includes side bars 14 and a cross bar 15 supported by the side bars 14. Pivotally connected links 16 connect with the side bars 14 and the side walls 12 for bracing the back rest when in a raised position, and which foldable links permit the back rest to be folded down over the seat member as shown in dotted lines in Figure 1 of the drawings, when the device is not in use.

Associated with the seat member 10 is a clamping means which includes sets of co-acting clamping members mounted on the opposite side walls 12 and each set includes a substantially L-shaped clamping member 17, the long arm of which is provided with an elongated slot 18, while the angularly disposed portion constitutes a jaw 19. Passing through the slot 18 is a threaded bolt 19 to which a wing nut 20 is threadedly connected. The other clamping member is designated at 21 and is slotted longitudinally as at 22, while the lower end of which is provided with an outwardly extending flange or foot 23. Passing through the slot 22 and through the side wall 12 is a threaded bolt 24 which threadedly receives a thumb nut 25. In Figure 1 of the drawings I have illustrated the seat as applied to a conventional type of window sill A wherein the bottom 11 of the seat member rests upon the top of the sill exteriorly of the window casing and which seat member is held in position by reason of the foot 23 of each of the clamping members 21, resting upon the top of the sill, while the inwardly extending jaw 19 of the other clamping element 17 engages beneath the overhanging edge of the sill. The clamping elements may be adjusted so as to facilitate the attachment of the seat to window sills of different styles and construction. In order to adjust the clamping elements, it is only necessary to loosen the thumb nuts and slide the said elements relative to each other and after they have been adjusted, the clamping nuts may be tightened for securely holding the seat in position.

Extending forwardly of the seat member 10 and disposed against the inner side of the side wall 12, are extension arms 26, each being provided with a zig-zag slot 27 through which a bolt 28 passes and which bolt also freely passes through an opening provided in the side wall 12. A thumb nut 29 is threaded to the free end of the bolt for securing the extension arm in an adjusted position. By forming the slot 27 of a zig-zag shape, shoulders 30 are provided with which the bolt 28 may engage when the extension arms are adjusted so as to prevent any possible sliding of the extension arms when the thumb nuts 29 are in tightened position. Supported by the outer ends of the extension arms 26 is a cross bar 31, the ends of which extend beyond the outer sides of the extension arms for engagement with the inner side of the window casing. This bar coacts with the clamping elements to prevent accidental shifting of the seat outwardly of the window sill.

From the foregoing description, it will be seen that I have provided a window cleaner's seat which may be securely mounted upon the sill of a window to receive a person in a seated position for safely permitting the washing of the outer panes of the upper and lower sashes of a window. When not in use, the extension arms 26 may be slid inwardly of the seat member 10 and the back rest folded down upon the seat member to provide a compact structure.

Although I have shown and described what I deem to be the most desirable embodiment of my invention, it will be understood that various changes in construction may be resorted to if desired, as come within the scope of the appended claims.

Having thus described the invention, what I claim as new and desire to secure by Letters Patent is:—

1. A window cleaner's seat comprising a seat member having end walls, a pair of co-acting clamping members slidably mounted on each end wall, one of said clamping members being provided with a jaw underlying the lower end of the other clamping member, and means for securing said clamping members in an adjusted position.

2. A window cleaner's seat comprising a seat member having end walls, a pair of co-acting clamping members slidably mounted on each end wall, one of said clamping members being provided with a jaw underlying the lower end of the other clamping member, and means for securing said clamping members in an adjusted position, said means including an elongated slot provided in each member, a threaded bolt passing through the slot of each member and through an end wall of said seat member, and a nut threaded on said bolt.

In testimony whereof I affix my signature.

RUDOLPH STALZER.